United States Patent [19]

Santella

[11] Patent Number: 5,332,104
[45] Date of Patent: Jul. 26, 1994

[54] BICYCLE RACK

[76] Inventor: Michael Santella, C.P. 1323 Place Bonaventure, Montreal, Canada, H5A 1H1

[21] Appl. No.: 892,140

[22] Filed: Jun. 2, 1992

[51] Int. Cl.⁵ .............................................. A47F 7/00
[52] U.S. Cl. ........................................ 211/18; 211/99
[58] Field of Search .................. 211/17, 18, 19, 21, 211/104, 99, 100

[56] References Cited

U.S. PATENT DOCUMENTS

| 610,656 | 9/1898 | Martin | 211/18 |
| 2,706,049 | 4/1955 | Andrews | 211/104 X |
| 3,484,069 | 12/1969 | Larson | 211/100 X |
| 5,054,628 | 10/1991 | Allen | 211/18 X |
| 5,125,517 | 6/1992 | Martinell | 211/18 |

FOREIGN PATENT DOCUMENTS 86855 11/1957 Netherlands ................ 211/18

Primary Examiner—Robert W. Gibson, Jr.

[57] ABSTRACT

There is provided a bicycle storage device which includes a housing bracket and first and second bicycle support members. Each member is moveable from a storage position to a bicycle support position; each member has an elongated arm which rotates from an upward stored position to a horizontally extending support position with a resilient member maintaining the members in a storage position.

5 Claims, 2 Drawing Sheets

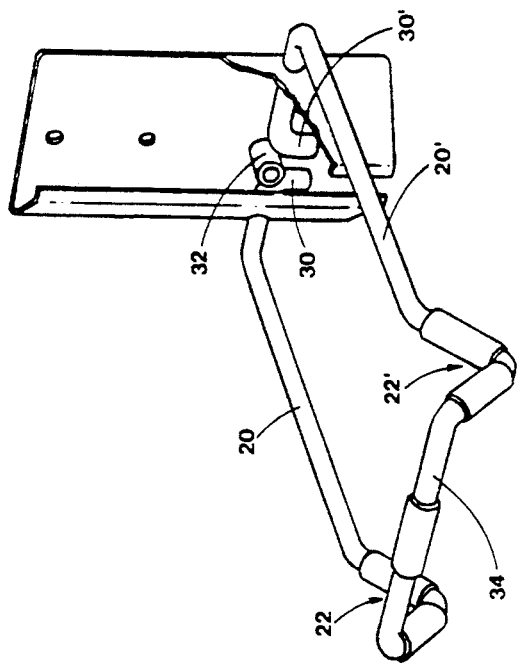
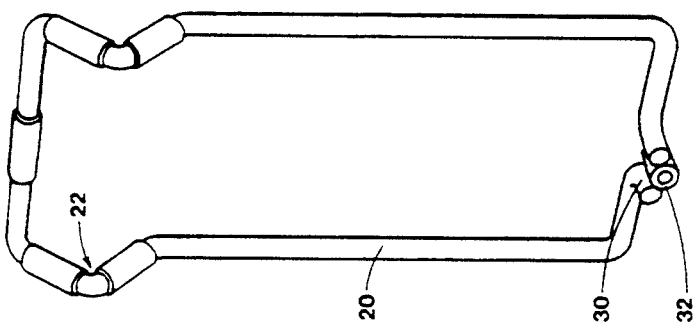
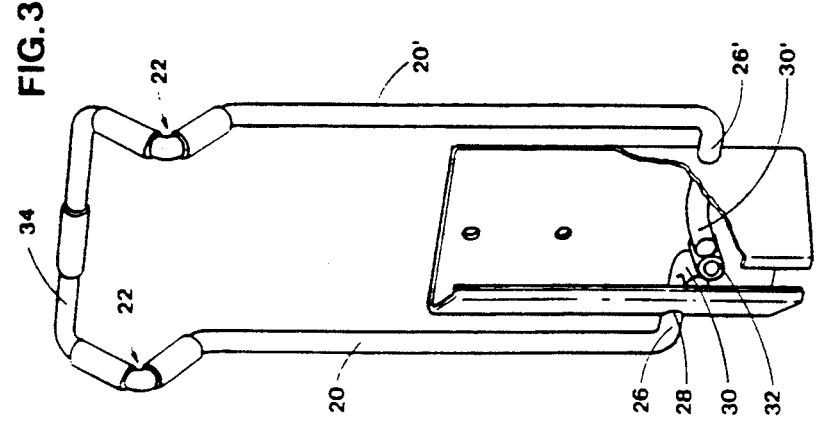

BICYCLE RACK

The present invention relates to a bicycle storage device and more particularly, relates to a bicycle storage device which is adapted to be secured to a structure.

Bicycle storage devices are well known in the art as it is frequently desirable to store a bicycle in a garage, shed or other structure or dwelling. Typically, these devices are attached to a wall of the structure. Naturally, it is desirable that the device be unobtrusive when it is not being utilized for the purpose of storing a bicycle.

It is an object of the present invention to provide a compact bicycle storage device which, when not being utilized for the purpose of storing a bike, utilizes a minimum of space.

According to one aspect of the present invention, there is provided a bicycle storage device which includes a housing bracket portion which is adapted to be attached to a structure on which the bicycle is to be supported. The device includes first and second bicycle support members with each of the support members having an elongated arm portion having a bicycle support means at one end thereof, an intermediate portion at the other end of said elongated arm portion, and a base portion. The elongated arm portion and intermediate portion each have an axis which lies in substantially the same plane and are mutually perpendicular. The base portion has an axis which lies in a plane which is substantially perpendicular to that of the intermediate and elongated arm portions. The intermediate portion is rotatably journalled in the housing such that each arm may move from a first storage position to a second bicycle support position. In the bicycle support position, the base portion contacts the housing to provide support for the elongated arm portion and prevents further rotatable movement thereof. In the storage position, there is provided a resilient member which supports the base portion to maintain the elongated arm portion in the storage position.

In greater detail, the bicycle storage device of the present invention may be used for attachment to any suitable structure such as the wall of a dwelling or indeed, may be adapted for securement to a vehicle. In this respect, the housing may be attached to the structure by any suitable conventional means such as screws, nails, bolts, etc.

The device includes a pair of bicycle support members which are preferably elongated elements which are formed in the desired configuration as discussed hereinbelow. Each member has an elongated arm portion which is rotatable between a vertical storage position and a horizontal support position. At the free end of the arm there is provided a bicycle retaining means which may conveniently comprise a suitable bend in the arm to receive the frame of the bicycle. At the other end of the arm portion there is provided an intermediate portion which has an axis in the same plane as the axis of the elongated arm portion, but which is substantially perpendicular thereto. The intermediate portion desirably extends through a portion of the bracket housing and is rotatably journalled therein.

At the other end of the intermediate portion, there is provided a base portion which has an axis which is in a plane substantially perpendicular to the intermediate and arm portion. In its operative position, the base portion contacts the housing bracket to provide support for the elongated arm portion and to prevent further downward rotatable movement thereof. When the arms are rotated upwardly to a storage position, the base portion will extend outwardly from the housing bracket. In this position, a resilient member is provided to maintain sufficient pressure on the base portion to prevent the arms from rotating downwardly to the operative position. The resilient member is designed such that when sufficient force is applied, the base of the bicycle support member can move past the resilient member to its operative position to provide the required support.

In a preferred embodiment, the first and second bicycle support members are formed of a single piece and thus the free ends of the support arms are joined to form a single unit.

Having thus generally described the invention, reference will be made to the accompanying drawings illustrating an embodiment thereof, in which:

FIG. 3 is a view illustrating the functioning of the support members in a storage position;

FIG. 4 is a side elevational view of the embodiment of FIG. 3; and

FIG. 5 is a perspective view of the support members when in an operative position.

Figure 2:
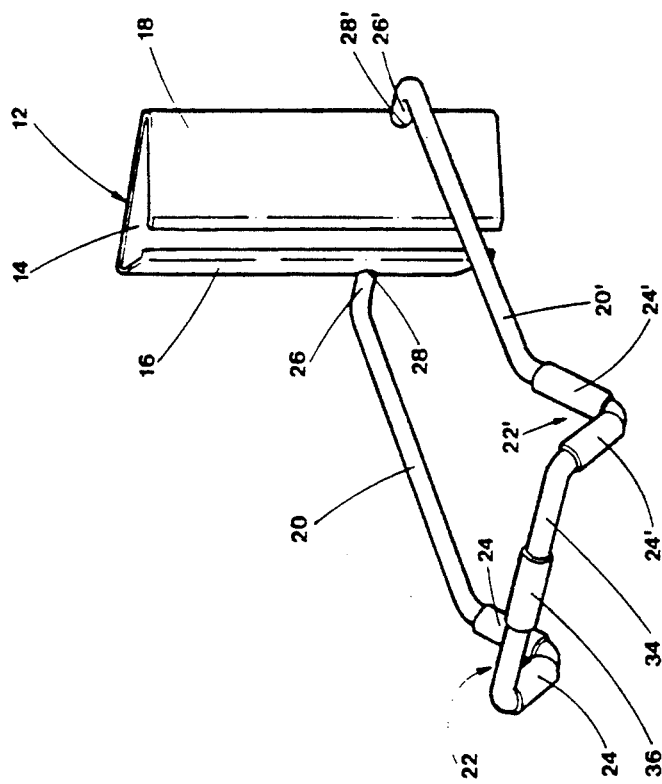
FIG. 2 is a view similar to FIG. 1 showing the support arms in an operative position.
Figure 1:
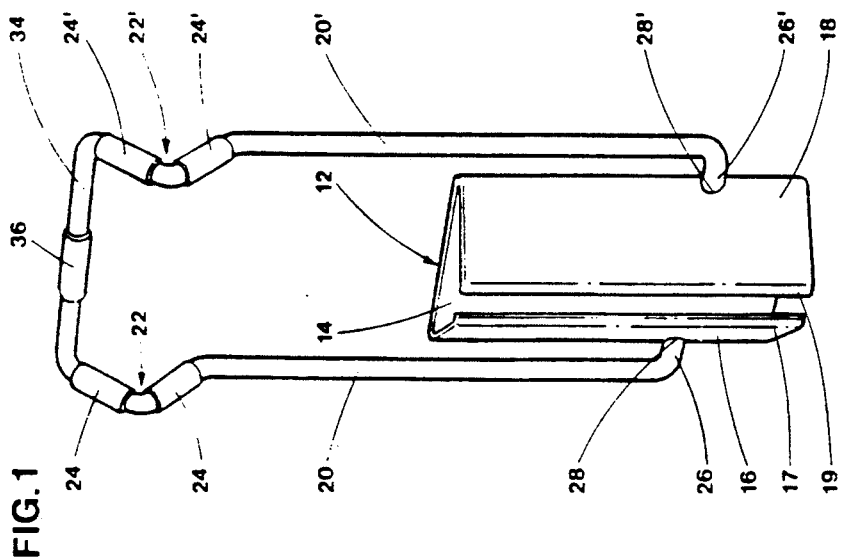
FIG. 1 is a perspective view of a bicycle storage device with the support arms being in a storage position.

The device of the present invention, as shown in FIGS. 1 and 2, includes a housing 12 which is formed to have a back wall 14 and a pair of side walls 16 and 18. Side walls 10 and 18 converge inwardly to have a somewhat triangular configuration and terminate in front walls 17 and 19 respectively.

The device includes first and second support members which are substantially identical and thus, only one will be described with the other member carrying like numerals with a prime.

The first support member includes an elongated arm portion 20 having a V-shaped portion generally designated by reference numeral 22 at one end thereof. Mounted about arm portion 20 in V-shaped portion 22 are cushioning means 24 which may be formed of rubber, plastic or fabric to prevent damage to the frame of the bicycle when placed in portion 22.

At the other end of elongated arm 20, as may best be seen in FIGS. 3 and 5, there is provided an intermediate portion 26 which has an axis which lies on the same plane as the axis of arm 20 but is perpendicular thereto. Intermediate portion 26 passes through wall 16 and may be supported by a suitable bearing 28.

At the other end of intermediate portion 26 is a base portion 30 which, as may be seen, has an axis which is in a plane perpendicular to the plane of the axis of arm 20 and intermediate portion 26. A resilient member 32 is provided for reasons to be discussed below.

In its storage position, as shown in FIG. 1, 3 and 4, arms 20 and 20' are in a vertical position and end portions 30 and 30' extend outwardly. Resilient member 32 is sized so as to support both base portions 30 and 30' and prevent the downward movement thereof and thus retain the arms in the desired storage position.

When it is desired to move the arms 20 and 20' to an operative position, sufficient pressure is placed on the arms such that base portions 30 and 30' will compress member 32 and permit their movement past member 32 to the position shown in FIG. 5. In this position, base portions 30 and 30' will lie substantially parallel to the interior wall 14 of housing bracket 12 to thereby limit further movement of arms 20 and 20'. Resilient member 32 is suitably attached to wall 14 of housing bracket 12. Similarly, housing 12 may be secured, by means of screws or the like through wall 14, to the structure to which it is to be attached (normally a wall). In the illustrated embodiment, it will be noted that arms 20 and 20' are joined together by end bar 34 to effectively form a single piece unit. Alternatively, independent arms may be utilized. A further cushioning means 36 may be placed on end bar 34.

It will be understood that the above described embodiment is for purposes of illustration only and that changes and modifications may be made thereto without departing from the spirit and scope of the invention.

I claim:

1. A bicycle storage device comprising a housing bracket, a stop member, and first and second bicycle support members, each of said bicycle support members comprising an elongated arm portion having a bicycle retaining means located at one end thereof, an intermediate portion joining an opposite end of said elongated arm portion, the intermediate and arm portions having an axis in the same plane and substantially perpendicular to each other and a base portion joined to the opposed end of the intermediate portion, said base portion having an axis in a plane substantially perpendicular to said intermediate and arm portions, each of said intermediate portions being rotatably journalled by said housing bracket, the arrangement being such that when in a bicycle support position, said elongated arm portions extend horizontally outwardly from said housing bracket and said base portion contacts said housing bracket to support said arm portions, and when said arm members are rotated to a vertical storage position, said base portions are supported by said stop member to thereby retain said members in the storage position.

2. The bicycle storage device of claim 1 wherein said stop member comprises at least one resilient member mounted on said housing bracket below said base portion of said bicycle support members and adapted to prevent rotatable movement said support member until force is applied thereto.

3. The bicycle storage device of claim 1 wherein said bicycle retaining means comprises a V-shaped outline formed in said elongated arm portions.

4. The bicycle storage device of claim 3 wherein said first and second bicycle support members are formed of a single unit and are joined together at an end adjacent the bicycle retaining means.

5. The bicycle storage device of claim 4 further including cushioning members located at said bicycle retaining means.

* * * * *